April 3, 1951  B. D. BEDFORD  2,547,615
SATURABLE CORE REACTOR
Filed Oct. 26, 1948  2 Sheets-Sheet 1

Inventor:
Burnice D. Bedford,
by Ernest C. Britton
His Attorney.

Patented Apr. 3, 1951

2,547,615

UNITED STATES PATENT OFFICE 2,547,615

SATURABLE CORE REACTOR

Burnice D. Bedford, Scotia, N. Y., assignor to General Electric Company, a corporation of New York Application October 26, 1948, Serial No. 56,585

7 Claims. (Cl. 323—43.5)

This invention relates to saturable core reactors and has as its principal object increased efficiency of operation of saturable core reactors when applied to use in variable voltage circuits.

It is old in the art to use saturable core reactors to obtain variable voltage output by, for example, connecting two reactors in series across voltage taps of the secondary of a transformer. One side of the transformer may then be connected to a load and the other side of the load to the junction point of the two saturable core reactors. Thus, by controlling the relative degree of saturation of each core and thereby the relative impedance of each reactor, the voltage output of the transformer may be made to vary between that of the minimum voltage tap and that of the maximum voltage tap. In the case just mentioned it is necessary to maintain a high degree of saturation in the cores if the load current is great in order to prevent the cores from unsaturating as a result of the cyclic variation of magnetomotive force due to the alternating load current. If the saturating current remains constant as the load current decreases, excessive circulating current will result because of the low impedance path offered by the saturated reactors. This is not only undesirable because of the additional reactor copper loss, but there is reflected into the transformer primary an increase in the reactive load of the circuit and, thus, a decrease in the circuit power factor. I have, therefore, found it desirable to have the degree of saturation of the reactor cores vary directly as a function of the load current. Thus, at low loads the degree of saturation of the reactor cores will be small and at high loads great. This results in added efficiency of operation and better load power factor.

In the circuits prescribed by this invention the saturation of the reactor cores is varied as a function of the load current by supplying a portion of the saturating current from a current transformer rectifier combination wherein the transformer output is dependent upon the current in the load circuit.

It is another object of this invention to provide, in a variable voltage circuit employing saturable core reactors, means for adjusting the degree of saturation of the reactor cores as a function of load current.

This invention will be better understood from the following description taken in connection with the accompanying drawings and its scope will be pointed out in the appended claims.

Figure 1:
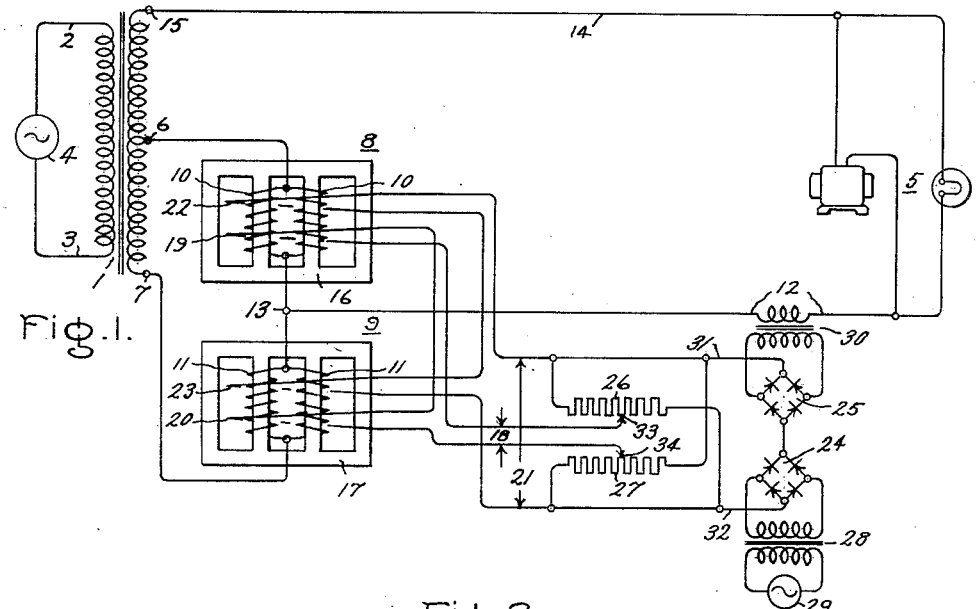
Figure 2:
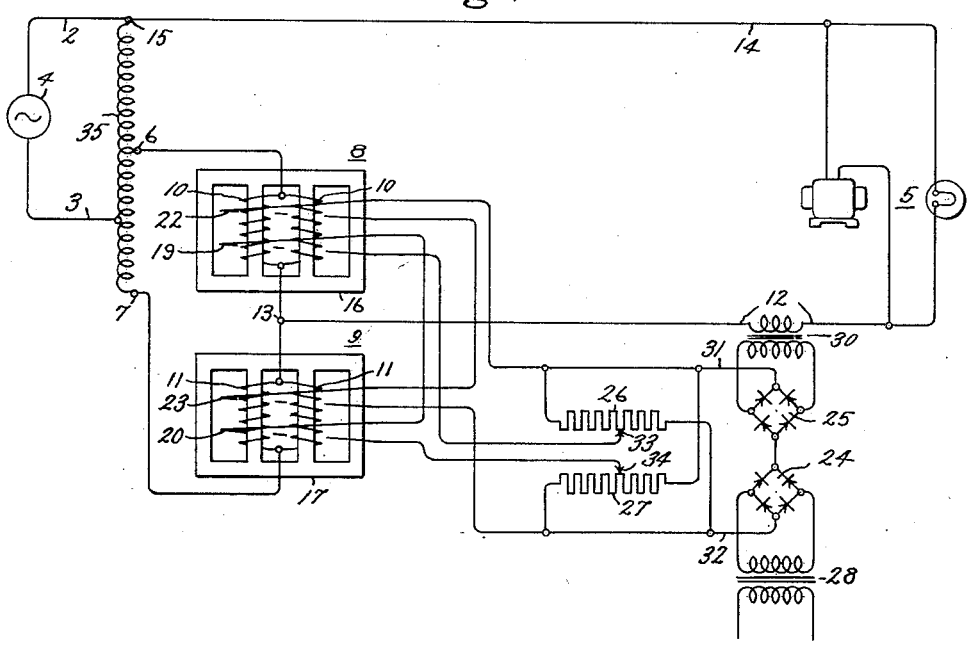
Figure 3:
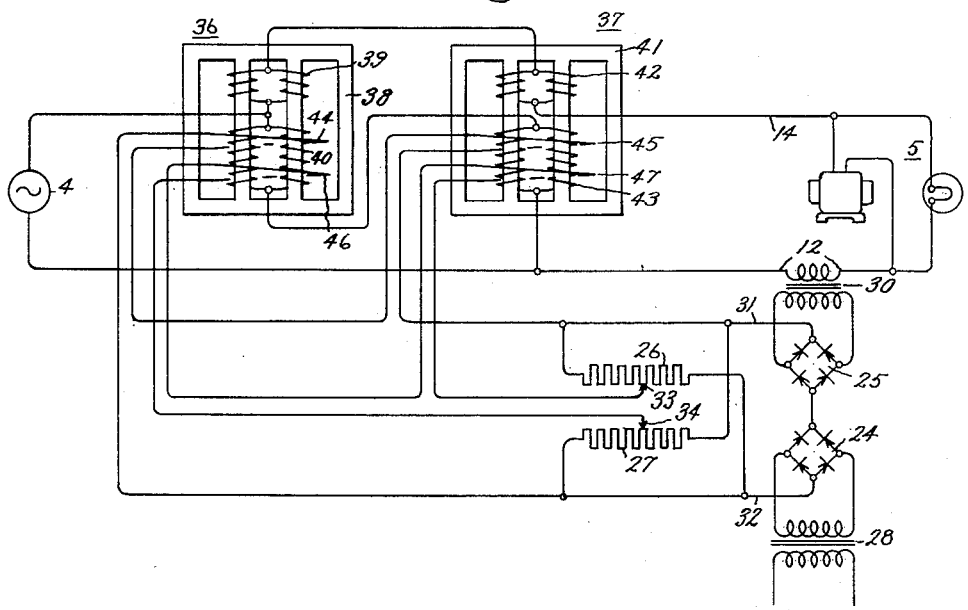

In the drawing, Fig. 1 is a circuit diagram of a particular embodiment of the invention; Fig. 2 is a circuit diagram of an alternative construction of the invention, and Fig. 3 is a circuit diagram of another alternative construction of the invention.

In the drawing there is shown in Fig. 1, by way of example, a transformer 1 having its primary leads 2 and 3 connected to an alternating current power source 4. The secondary of the transformer 1 supplies power to a variable load 5 which may be similar to one found in distribution circuits being made up of a number of separate loads as shown. The secondary of the transformer 1 is provided with voltage taps 6 and 7 so that the transformer's output may be varied between the voltage values corresponding to the tap voltages. In order to provide smooth voltage variation between taps 6 and 7, two saturable core reactors 8 and 9 having alternating current windings 10 and 11, respectively, are connected in series. One lead 12 of the load 5 is connected to the junction point 13 of the A.-C. windings 10 and 11, and the other lead 14 is connected to the secondary of the transformer 1 at tap 15.

In order to adjust both the voltage output of the secondary of the transformer 1 and the degree of saturation of the cores 16 and 17 of the reactors 8 and 9, two direct current excitation circuits are employed. A control circuit 18 having series connected coils 19 and 20 wound on the reactor cores 16 and 17, respectively, fixes the magnitude of the secondary voltage output, assuming a constant voltage source 4 by establishing a fixed ratio of impedance of the reactors 8 and 9. A bias circuit 21 having series connected coils 22 and 23 wound on the reactor cores 16 and 17, respectively, is principally responsible for the variation of core saturation with changes in load. The control coils 19 and 20 are oriented with respect to the bias coils 22 and 23 so that bias and control fields in one core will be additive and in the other core bucking.

Both the bias circuit 21 and the control circuit 18 are supplied from rectifiers 24 and 25 which are connected in series. The bias circuit 21 is connected directly across the output of the rectifiers 24 and 25 and the control circuit 18 is coupled through potentiometers 26 and 27 across the output of the rectifiers 24 and 25 and in parallel with the bias circuit 21. The rectifier 24 is supplied through a transformer 28 from a source 29 of constant alternating potential and establishes in both the bias and control circuits 21 and 18 an initial and constant component of exciting current, thus providing a slight degree of saturation within the cores 16 and 17 of the reactors 8 and 9. The reason why this constant excitation is necessary will become obvious as the explanation proceeds.

The rectifier 25 is supplied by a current transformer 30 which is serially connected with the load 5. Thus, the output of rectifier 25 is substantially a linear function of load current. Initially consider the case when there is no load current or the circuit to the load 5 is opened. The flow of current through the bias circuit 21 is always in one direction since line 31 is positive and line 32 is negative. The flux induced in the reactor cores 16 and 17 by the bias current is continuously in the same direction and its magnitude is dependent upon the output of the rectifiers 24 and 25. Thus an initial partial saturation of the reactor cores 16 and 17 is achieved. Assume that the flow of exciting current is in the direction indicated by the rectifier arrows which means that lead 31 connected to the rectifier 25 is the positive side of the line and lead 32 connected to rectifier 24 is the negative side of the line, as shown in Fig. 1. In this application of the invention, it is desirable to have the saturating coils 19, 20, 22 and 23 identical. In order to establish the desired value of secondary voltage (let $V_6$ represent the secondary voltage corresponding to tap 6, $V_7$ represent voltage corresponding to tap 7, and $V_s$ the desired secondary voltage having a value lying between $V_6$ and $V_7$) the relative impedance of the reactors 8 and 9 is adjusted so that $V_s$ is the load voltage. Then no exciting or saturating current is supplied by the rectifier 25 but only by the rectifier 24. As can be seen in the drawing, the potentiometers 26 and 27 are connected across the exciting current supply leads 31 and 32, and the control current through the coils 19 and 20 is regulated in both magnitude and direction of flow by the location of the contacts 33 and 34 which cooperate with the potentiometers 26 and 27 and the control circuit 18. As was mentioned previously the control coils 19 and 20 are oriented with respect to the bias coils 22 and 23 so that the bias and control fields in one core are additive and in the other bucking.

Assume that the voltage output of the transformer 1, $V_s$, is to be fixed at the voltage $V_6$ or as close to it as possible. It is then necessary that core 16 be saturated and core 17 unsaturated so that the impedance of reactor 9 is considerably greater than that of reactor 8. By moving the contacts 33 and 34 to the right in Fig. 1 so that contact 33 is at the same potential as line 32 and contact 34 is at the same potential as line 31, the desired end will be accomplished. It can be seen that the magnetomotive forces acting on core 16 due to the control and bias coils 19 and 22 are equal and are additive, saturating the core 16, and the magnetomotive forces acting on core 17 due to the control and bias coils 20 and 23 are equal and are bucking, cancelling one another, thus presenting an unsaturated core 17. Considering the other extreme case where $V_s$ is approximately equal to $V_7$, core 17 must be saturated and core 16 unsaturated. The potentiometer contacts 33 and 34 are then moved to the left so that contact 33 is at the same potential as line 31 and contact 34 is at the potential of line 32. Though the magnitude of the current through the control coils 19 and 20 is the same as in the previously considered case its direction of flow has been reversed. Thus core 17 saturates while core 16 unsaturates and the impedance of reactor 8 is many times that of reactor 9. By adjusting the position of the contacts 33 and 34 on the potentiometers 26 and 27 the magnitude and the direction of the current through the coils 19 and 20 may be controlled and any transformer output voltage, $V_s$, having a value between $V_6$ and $V_7$ may be achieved. It can be seen that the constant exciting current from the rectifier 24 is necessary to allow the proper adjustment of $V_s$ even when the secondary of the transformer 1 is open circuited.

When the contacts 33 and 34 mid-tap the potentiometers 26 and 27 the voltage output of the transformer 1 is midway between the voltage represented by tap 6 and that represented by tap 7. This is the case shown in Fig. 1 and which we will now consider. Assume a high value of load current which would necessitate a fairly large exciting current flowing through the saturating coils 19, 20, 22 and 23 of the reactors 8 and 9 so that saturation would not be reversed due to the alternations of current flowing through the coils 10 and 11. If the load were to drop, that is, the load current decreases in value, the exciting current would be greater than that which is necessary to maintain core saturation, and excessive circulating currents through the coils 10 and 11 of the reactors 8 and 9 would result due to the low reactor impedance resulting from the high degree of saturation. Not only would excessive power losses be caused by the circulating currents, but the power factor of the circuit would be decreased due to the increase in the reactive load. Thus, to increase the efficiency of circuit operation the exciting current should be made a function of the load current and this is achieved by exciting the reactor cores 16 and 17 from the rectifier 25 which is inductively connected to the secondary circuit of the transformer 1 by the current transformer 30.

In Fig. 2 an autotransformer 35 is used to achieve voltage transformation rather than the transformer 1 in Fig. 1. The means for controlling the reactor circulating current by varying the degree of core saturation as a function of load current is the same as that shown in Fig. 1. The reactors are so connected to the autotransformer that equal voltage increases and decreases above and below line voltage may be achieved by controlling the relative impedance of the reactors.

Fig. 3 is very similar to Fig. 2, but instead of using an autotransformer and separate saturable reactors, the reactors 36 and 37 are so constructed and connected in the circuit that they serve the dual purpose of autotransformer and reactors for voltage control. On core 38 of reactor 36 are wound two separate alternating current windings 39 and 40, and similarly on core 41 of reactor 37 are wound alternating current windings 42 and 43. As can be seen in Fig. 3, the windings 39 and 42 are serially interposed between the source 4 and the load 5 whereas the windings 40 and 43 are connected in series and coupled in parallel with the load. It can also be seen that winding 39 produces a voltage which tends to boost that of the line and the winding 42 is connected so that its voltage will buck that of the line. The circuit for controlling the degree of saturation of the reactor cores 38 and 41 as a function of load current is the same as those shown in Figs. 1 and 2, and, thus, on cores 38 and 41, respectively, are wound bias coils 44 and 45 and control coils 46 and 47.

When reactor 37 is completely saturated, maximum voltage across the load 5 results, since reactor 36 acts as an autotransformer and the voltage boosting effect of coil 39 is completely utilized, whereas if reactor 36 is completely saturated minimum voltage across the load 5 results, since the bucking effect of coil 42 causes a drop in the line voltage. By adjusting through the control and the bias circuits the relative impedances of the reactors 36 and 37, any voltage output between the minimum value corresponding to reactor 36 being completely saturated and reactor 37 unsaturated, and the maximum value, corresponding to reactor 37 being completely saturated and reactor 36 unsaturated, may be achieved.

While there have been shown and described particular embodiments of this invention, it will be obvious to those skilled in the art that various changes and modifications can be made therein without departing from the invention, and, therefore, it is aimed in the appended claims to cover all such changes and modifications as fall within the true spirit and scope of the invention.

What I claim as new and desire to secure by Letters Patent of the United States is:

1. In a circuit of the type comprising a power source and a load, a voltage regulating system comprising at least two saturable core reactors, each of said reactors having at least one alternating current coil and one direct current coil wound on a magnetic core, said alternating current coils being serially connected one to the other and coupled across at least a portion of said source, said load being coupled between the junction point of said alternating current coils and said source, means responsive to the magnitude of the load current for controlling the absolute saturation of said cores without affecting the relative impedances of said reactors one to the other, said means comprising a bias circuit for establishing a reference degree of saturation of said cores including at least one of said direct current saturating coils of each of said reactors, said coils being serially connected and coupled across the output of a direct current source including rectifying means, a control circuit for regulating the relative impedances of said reactors including at least one of said direct current saturating coils of each of said reactors, said coils being serially connected and coupled across the output of a potentiometer circuit, said potentiometer circuit being coupled in parallel with said bias circuit, said potentiometer circuit providing means for controlling the magnitude and the direction of flow of the current in said control circuit, said control circuit being so disposed in relation to said bias circuit that the magnetomotive force produced by the control current in said control circuit bucks in one of said reactor cores and boosts in the other of said reactor cores, the magnetomotive force produced by the bias current in said bias circuit, said rectifying means being coupled to the output of a current transformer, said current transformer being serially connected with said load.

2. In a circuit of the type comprising a power source and a load, a voltage regulating system comprising at least two saturable core reactors, each of said reactors having at least one alternating current coil and one direct current coil wound on a magnetic core, said alternating current coils being serially connected one to the other and coupled across at least a portion of said source, said load being coupled between the junction point of said alternating current coils and said source, means responsive to the magnitude of the load current for controlling the absolute saturation of said cores without affecting the relative impedances of said reactors one to the other, said means comprising a bias circuit for establishing a reference degree of saturation of said cores including at least one of said direct current saturating coils of each of said reactors, said coils being serially connected and coupled across the output of a circuit current source including rectifying means, a control circuit for regulating the relative impedances of said reactors including at least one of said direct current saturating coils of each of said reactors, said coils being serially connected and coupled across the output of a potentiometer circuit, said potentiometer circuit being coupled in parallel with said bias circuit, said potentiometer circuit providing means for controlling the magnitude and the direction of flow of the current in said control circuit, said control circuit being so disposed in relation to said bias circuit that the magnetomotive force produced by the control current in said control circuit bucks in one of said reactor cores and boosts in the other of said reactor cores, the magnetomotive force produced by the bias current in said bias circuit, said rectifying means being coupled to the output of a current transformer, said current transformer being serially connected with said load, said direct current source including means for establishing a current flow through said bias and said control circuits when the circuit to said load is open.

3. In a circuit of the type comprising a power source, a load and a transformer being interposed between said power source and said load, a voltage regulating system comprising at least two saturable core reactors each of said reactors having at least one alternating current coil and one direct current coil wound on a magnetic core, said alternating current coils being serially connected one to the other and coupled across at least a portion of the secondary of said transformer, said load being coupled between the junction point of said alternating current coils and said secondary, means responsive to the magnitude of the load current for controlling the absolute saturation of said cores without affecting the relative impedances of said reactors one to the other, said means comprising a bias circuit for establishing a reference degree of saturation of said cores including at least one of said direct current saturating coils of each of said reactors, said coils being serially connected and coupled across the output of a direct current source including rectifying means, a control circuit for regulating the relative impedances of said reactors including at least one of said direct current saturating coils of each of said reactors, said coils being serially connected and coupled across the output of a potentiometer circuit, said potentiometer circuit being coupled in parallel with said bias circuit, said potentiometer circuit providing means for controlling the magnitude and the direction of flow of the current in said control circuit, said control circuit being so disposed in relation to said bias circuit that the magnetomotive force produced by the control current in said control circuit bucks in one of said reactor cores and boosts in the other of said reactor cores, the magnetomotive force produced by the bias current in said bias circuit, said rectifying means being coupled to the output of a current transformer, said current transformer being serially connected with said load.

4. In a circuit of the type comprising a power source, a load and an autotransformer being interposed between said power source and said load, a voltage regulating system comprising at least two saturable core reactors, each of said reactors having at least on alternating current coil and one direct current coil wound on a magnetic core, said alternating current coils being serially connected one to the other and coupled across at least a portion of said autotransformer, said load being coupled between the junction point of said alternating current coils and said autotransformer, means responsive to the magnitude of the load current for controlling the absolute saturation of said cores without affecting the relative impedances of said reactors one to the other, said means comprising a bias circuit for establishing a reference degree of saturation of said cores including at least one of said direct current saturating coils of each of said reactors, said coils being serially connected and coupled across the output of a direct current source including rectifying means, a control circuit for regulating the relative impedances of said reactors including at least one of said direct current saturating coils of each of said reactors, said coils being serially connected and coupled across the output of a potentiometer circuit, said potentiometer circuit being coupled in parallel with said bias circuit, said potentiometer circuit providing means for controlling the magnitude and the direction of flow of the current in said control circuit, said control circuit being so disposed in relation to said bias circuit that the magnetomotive force produced by the control current in said control circuit bucks in one of said reactor cores and boosts in the other of said reactor cores, the magnetomotive force produced by the bias current in said bias circuit, said rectifying means being coupled to the output of a current transformer, said current transformer being serially connected with said load.

5. In a circuit of the type comprising a power source and a load, a voltage regulating system comprising at least two saturable reactors, each of said reactors having a plurality of alternating current coils and at least one direct current coil wound on a magnetic core, at least one of said alternating current coils of each of said reactors being serially connected one to the other and being coupled in parallel with said power source, another of said alternating current coils of each of said reactors being serially connected together and being interposed in series between said source and said load, means responsive to the magnitude of the load current for controlling the absolute saturation of said cores without affecting the relative impedances of said reactors one to the other, said means comprising a bias circuit for establishing a reference degree of saturation of said cores including at least one of said direct current saturating coils of each of said reactors, said coils being serially connected and coupled across the output of a direct current source including rectifying means, a control circuit for regulating the relative impedances of said reactors including at least one of said direct current saturating coils of each of said reactors, said coils being serially connected and coupled across the output of a potentiometer circuit, said potentiometer circuit being coupled in parallel with said bias circuit, said potentiometer circuit providing means for controlling the magnitude and the direction of flow of the current in said control circuit, said control circuit being so disposed in relation to said bias circuit that the magnetomotive force produced by the control current in said control circuit bucks in one of said reactor cores and boosts in the other of said reactor cores, the magnetomotive force produced by the bias current in said bias circuit, said rectifying means being coupled to the output of a current transformer, said current transformer being serially connected with said load.

6. In combination, an alternating current circuit, a pair of saturable core devices each having an alternating current winding connected to be traversed by current in said circuit, means for magnetizing the cores of both devices with equal unidirectional biasing ampere-turns having a fixed minimum finite value plus a variable amount proportional to the current in said alternating current circuit, and means for magnetizing the cores of both devices with an adjustable amount of unidirectional control ampere-turns variable from a maximum of one polarity through zero to a maximum of the opposite polarity, the relative polarity of the bias and control magnetizations being different in said two devices except when the control ampere-turns are zero.

7. In combination, a pair of similar saturable core devices each having an alternating current winding and two similar direct current windings, an alternating current circuit, said alternating current windings being connected to be traversed by current in said circuit, a control circuit including one direct current winding of each device in series, a bias circuit including the remaining direct current winding of each device in series, means for energizing the bias circuit with a fixed base value of direct current plus a variable amount of direct current proportional to the current in said alternating current circuit, and means including an adjustable polarity reversing potentiometer for connecting said control circuit in parallel circuit relation with said bias circuit, the relative polarity of the direct current windings being different in said two devices except when said potentiometer is so adjusted that there is no current in said control circuit.

BURNICE D. BEDFORD.

REFERENCES CITED

The following references are of record in the file of this patent:

UNITED STATES PATENTS

| Number | Name | Date |
|---|---|---|
| 1,337,875 | Alexanderson | Apr. 20, 1920 |
| 1,655,035 | Alexanderson | Jan. 3, 1928 |
| 1,843,745 | Thompson | Feb. 2, 1932 |
| 1,874,240 | Case | Aug. 30, 1932 |
| 1,997,657 | Schmutz | Apr. 16, 1935 |
| 2,039,044 | Wolfert et al. | Apr. 28, 1936 |